US008775850B2

(12) United States Patent
Moy

(10) Patent No.: US 8,775,850 B2
(45) Date of Patent: Jul. 8, 2014

(54) TRANSFERRING STATE INFORMATION BETWEEN ELECTRONIC DEVICES

(75) Inventor: Steven Ka Cheung Moy, San Francisco, CA (US)

(73) Assignee: Amazon Technologies, Inc., Reno, NV (US)

( * ) Notice: Subject to any disclaimer, the term of this patent is extended or adjusted under 35 U.S.C. 154(b) by 457 days.

(21) Appl. No.: 13/170,182

(22) Filed: Jun. 28, 2011

(65) Prior Publication Data

US 2013/0007499 A1    Jan. 3, 2013

(51) Int. Cl.
*G06F 3/14* (2006.01)
(52) U.S. Cl.
USPC ........... 713/400; 715/717; 715/718; 709/248; 455/556.2
(58) Field of Classification Search
USPC .................. 713/400; 715/203, 717, 778, 718; 455/556.2; 709/248
See application file for complete search history.

(56) References Cited

U.S. PATENT DOCUMENTS 6,884,171 B2 *   4/2005  Eck et al. .................... 463/42
7,623,892 B2 *  11/2009  Hawkins .................. 455/556.1
2007/0019682 A1   1/2007  Krzyzanowski
2009/0320073 A1  12/2009  Reisman
2011/0196826 A1*  8/2011  Retief et al. ................ 707/621

OTHER PUBLICATIONS

"International Search Report dated Oct. 1, 2012", International Application No. PCT/US12/44365, Oct. 1, 2012, 12 pages.

* cited by examiner

*Primary Examiner* — Thuan Du
(74) *Attorney, Agent, or Firm* — Novak Druce Connolly Bove + Quigg LLP

(57) ABSTRACT

Some embodiments enable a first electronic device (e.g., a notebook computer) to obtain state information directly from another electronic device (e.g., a smartphone) so that the first electronic device may replicate a state of content of the other computing device. This is useful when a user of an electronic device desires to switch between one device and another device such that the user may continue an activity (e.g., playing a video game) on another device without having to restart the activity. This is also useful when a user of a first electronic device attempts to replicate the state of the activity on a second device from another user such that both users may participate in the same activity. In some embodiments, a user of a device may obtain content from a server and state information from another device to replicate the state of content on the other device.

29 Claims, 8 Drawing Sheets

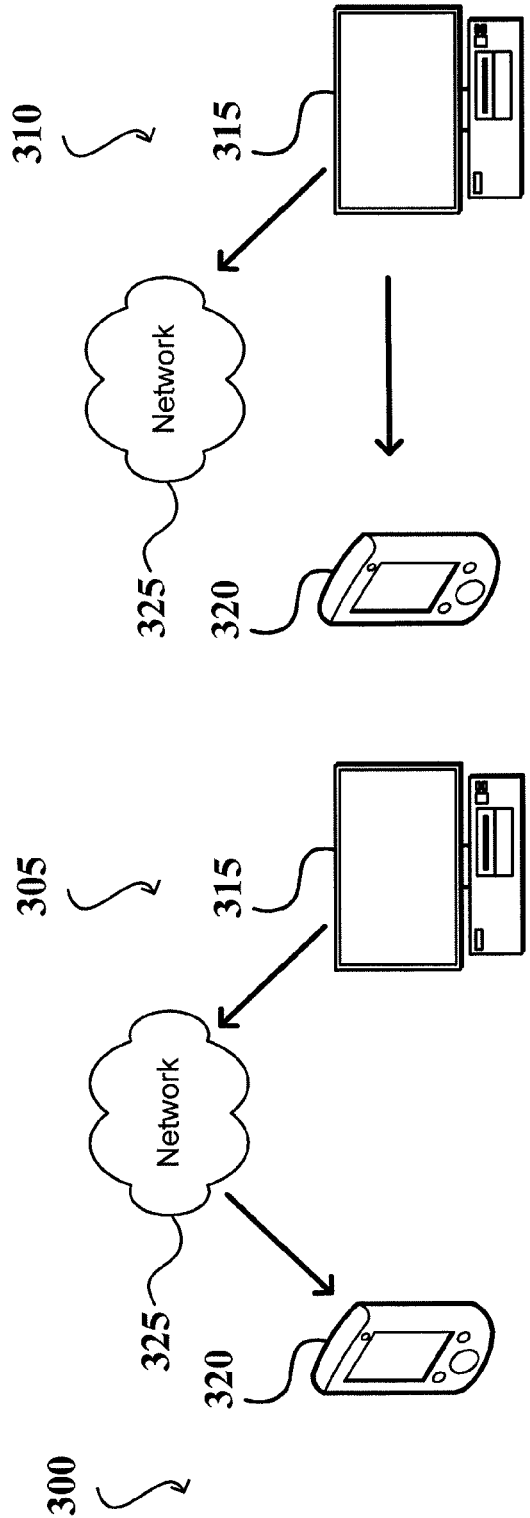
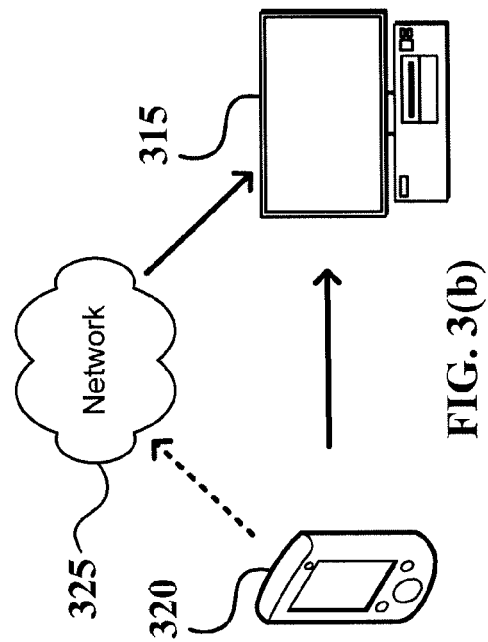
FIG. 3(a)
FIG. 3(b)

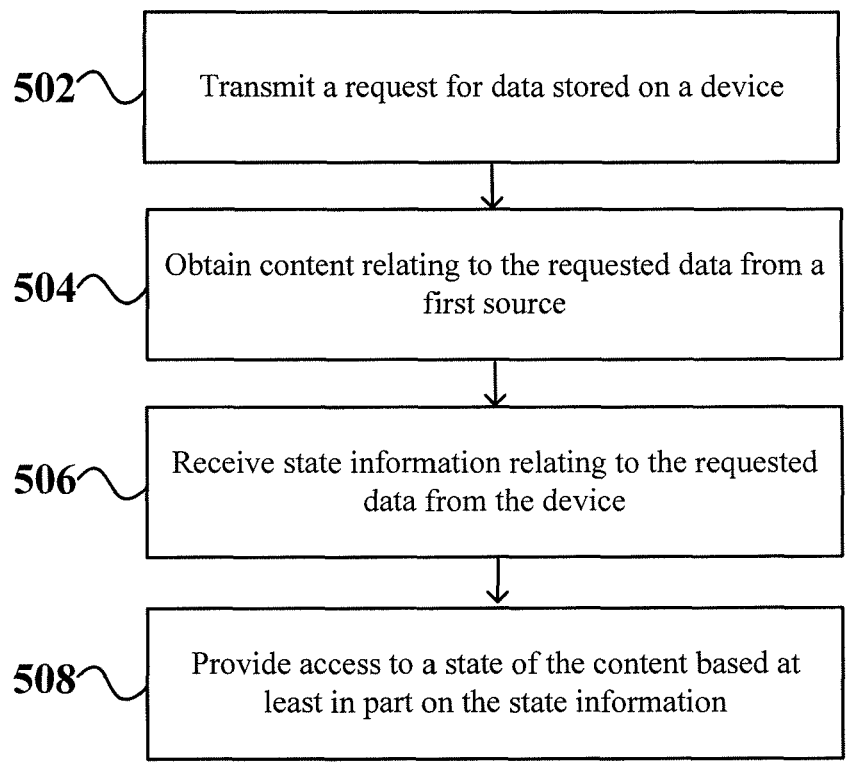

TRANSFERRING STATE INFORMATION BETWEEN ELECTRONIC DEVICES

BACKGROUND

People are utilizing electronic devices for an increasing number and variety of tasks. It is not uncommon for a user to possess or have access to multiple electronic devices. Within a single day, a user may switch between multiple electronic devices: from checking the weather on a personal computer at home, looking at a mobile device on the way to the car, using the work desktop as the user arrives the office, switching back to the mobile device when the user steps out of work or is on the way home, and then getting back onto the home desktop or laptop after the user returns home. Even while a user is within his home, the user may opt to switch from his home desktop from when he is in his bedroom to the big television screen while sitting in his living room or to his portable laptop at the dining table.

Oftentimes, when the user is moving between locations and switching between devices, the user may be three-quarters through reading a news article, in the middle of playing a video game, halfway through watching a YouTube® video, or partially through listening to a song. The user may find it inconvenient to switch between the different devices because the user may either need to relocate the information or start from the beginning again when switching between devices. There is currently no easy way for a user to switch between multiple devices easily without disrupting the user's interaction with the devices. As people continue to encounter an increasing number of electronic devices, a need exists to improve the overall user experience for users when switching between devices.

BRIEF DESCRIPTION OF THE DRAWINGS

Various embodiments in accordance with the present disclosure will be described with reference to the drawings, in which:

FIGS. 3(a) and 3(b) illustrate example situation of replicating state of content from a first device to a second device such that the second device displays the same state of content as the first device in accordance with various embodiments;

FIG. 5 illustrates an example process for enabling an electronic device to display a current state of a content displayed on a portable computing device in accordance with various embodiments;

DETAILED DESCRIPTION

Figure 1:
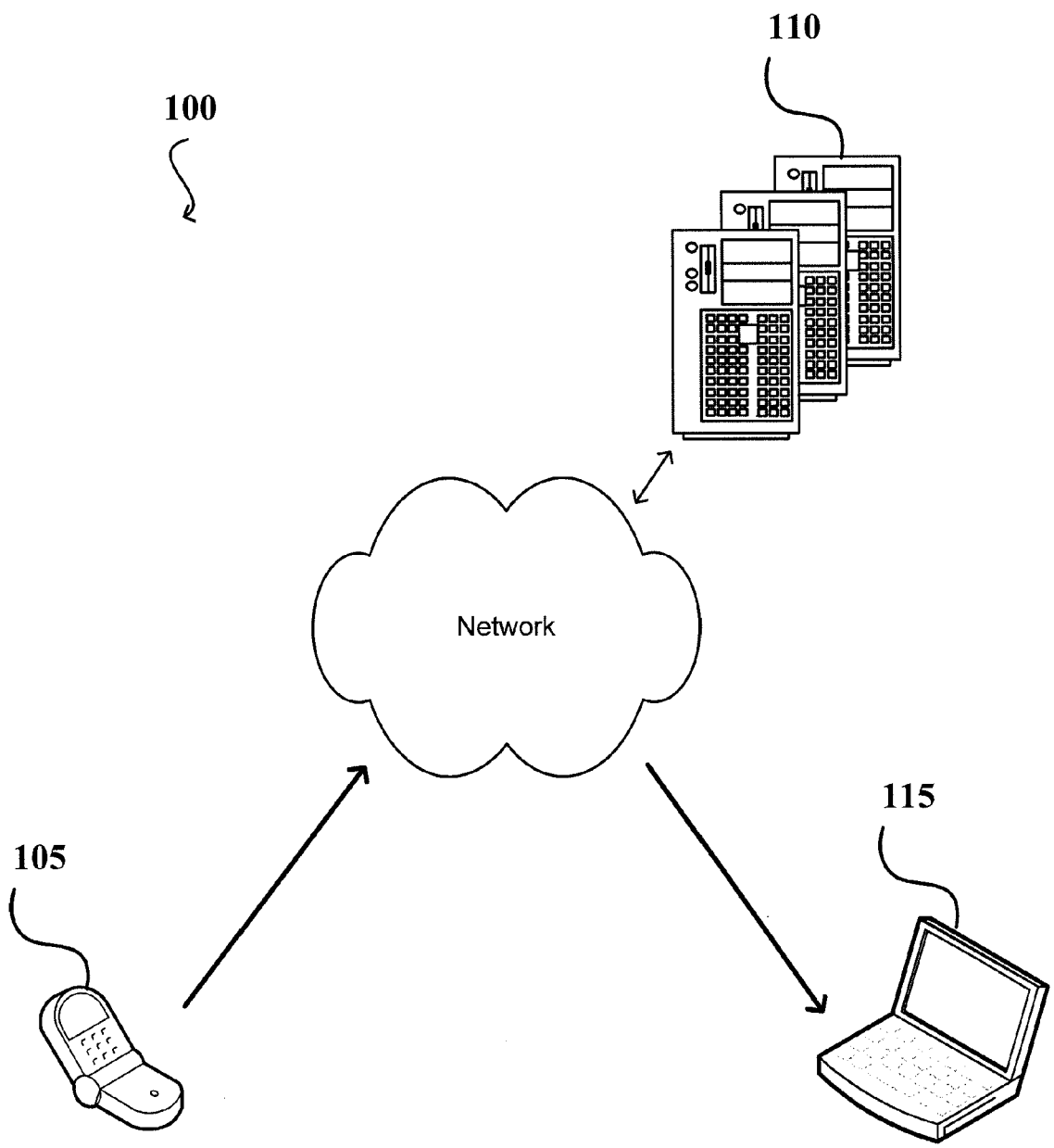
FIG. 1 illustrates an example situation of how a first device can obtain data from a second device in accordance with various embodiments.

Systems and methods in accordance with various embodiments of the present disclosure may overcome one or more of the aforementioned and other deficiencies experienced in conventional approaches in synchronizing ("syncing") content, or replicating state information, across two or more electronic devices. Syncing devices can cause at least one of the devices to be updated so that the devices each have the most recent version of at least selected or determined information (e.g., state information within a content or application).

Some embodiments enable an electronic device (e.g., desktop computers and portable computing devices such as laptop computers, tablet computers, smartphones, media players, personal digital assistants, etc.) to replicate a state of content of another device by causing the electronic device to obtain access to the content (e.g., data stored on a mobile device such as a video clip, an audio clip, a document, a Web page, etc. and software applications such as a gaming application, a contacts list application, etc.) if the electronic device does not already have access to the content, and also obtain access to specific state information (e.g., video frame(s) within the video clip, a point within the audio clip, a page within the document, a level within a video game, a point within a Web page, an updated contacts list) of the other device. By doing so, a user of the electronic device may conveniently resume an activity from a first user device (e.g., listening to a song, watching a YouTube® video, or reading an article on a smartphone) on another user device (e.g., a desktop, a laptop, or an Internet-capable television) without having to start from the beginning or resituate where the user had left off on the first user device.

Approaches in accordance with various embodiments enable an electronic device to obtain or replicate the state of content from a separate user device (e.g., a portable computing device) by submitting a request that causes the separate user device to send state information to the electronic device through a direct connection. The electronic device may then replicate the state of content of the separate user device by obtaining access to the content (e.g., through a network connection with a remote server), if not already stored or obtained by the electronic device, and by using the received state information to access the state of the content that was last accessed on the separate user device.

In one embodiment, a portable computing device (or other first device) may allow an electronic device (or other second device) to replicate the state of content on the portable computing device by sending an invitation, such as one or more hyperlinks (e.g., a uniform resource locator (URL)) to the electronic device. The electronic device may obtain access to content from a server through one of the hyperlinks in some embodiments. In some embodiments, the server contains application data in addition to the application when the portable computing device syncs periodically with the server. The electronic device may then obtain state information with respect to the content directly from the portable computing device by following one of the hyperlinks, which can provide information enabling the portable computing device to send state or other such information to the electronic device.

In some embodiments, the electronic device may obtain state information directly from the portable computing device when there is no network (e.g., Internet) connection. For example, a desktop may create a direct connection using a wireless connection channel (e.g., Bluetooth®, Wi-Fi) or a wired connection (e.g., using a universal serial bus (USB) cable) to communicate with various portable computing devices. Via a direct connection, the portable computing device may send state information to the connected electronic device, with or without having an Internet connection. In some embodiments, the user may also receive a copy of the content from the portable computing device over the direct connection. The user of the electronic device may find the direct transfer of state information and/or content between the devices convenient when the user wants to receive the state of content from the portable computing device without Internet access (e.g., when he is on a camping trip, in the elevator, in the garage where there is no signal, etc.).

Approaches in accordance with various embodiments enable one or more devices to match the state of content from another device. Some embodiments enable a user of an electronic device to obtain content information (e.g., a gaming application, a word processing application, data of a computing device, a contacts list application, etc.) from a remote server. In some embodiments, the user of the electronic device may then obtain state information with respect to content information from a particular device (e.g., a portable computing device, a workstation, a video game console, etc.) through directly transferring the state information from the particular device to the electronic device (e.g., another portable computing device, a laptop, etc.). The user of the particular device may then conveniently continue the same activity on the electronic device without having to start all over. In some embodiments, a user of one device may transfer a state of content to a user of another device such that multiple users may participate in the same activity from the same point on.

Furthermore, the user of the electronic device may conveniently retrieve data stored on another device (e.g., a portable computing device owned by the user or another user). In some embodiments, the electronic device obtains the data stored on the portable computing device from a remote server when a direct connection between the devices is not available. The electronic device subsequently obtains the data from the remote server "in the cloud". In some embodiments, the electronic device obtains an instance of an application (e.g., address book application) and/or an updated version of the locally stored data (e.g., contacts list and any associated information) directly from the portable computing device (e.g., through a direct connection).

Various other applications, processes and uses are presented below with respect to the various embodiments.

FIG. 1 illustrates an example situation 100 of how a first device (herein, referred to as an electronic device) can obtain data from a second device (herein, referred to as a portable computing device for sake of clarity of explanation). Traditionally, syncing does not replicate or transfer state (e.g., video frame in a video) between devices as a user of one of the devices may inadvertently cause confidential information to be stored on the other user's device. Some embodiments enable a user to transfer content on an electronic device to a central location (e.g., remote server(s)) over a wired or wireless connection. In turn, the user may sync another device or retrieve updated information by connecting to the central location and then downloading or streaming the information similarly through a wired or wireless connection.

As described above, the data on a portable computing device 105, such as an application and its associated state information, may be stored at a central location (e.g., a central server) 110. In some embodiments, a user of the portable computing device stores some or all of the data on the portable computing device at the central location (e.g., by manually saving and syncing the data with a remote server). Periodically, the device of some embodiments automatically sends data (e.g., state information) from the portable computing device to a location for storage (e.g., every 5 seconds, every minute, every half hour). By having data stored in a location that is accessible by other devices on the same network, a user may retrieve data from another device by connecting to the data storage location. Here, the user of the electronic device 115 (e.g., a desktop computer) may retrieve certain content and/or associated state information from the portable computing device 105 by connecting to the central location (e.g., through a wireless communication channel (e.g., Bluetooth®, Wi-Fi, etc.).

As described above, some embodiments store a copy of all the content for a user account at a remote server. Users may then retrieve the content of the user account from any electronic device by obtaining permission to access the content of the user account (e.g., by logging onto a page on a Web browser, by inputting authentication credentials through an application installed on the device, etc.). In FIG. 1, the device 105 stores a copy of its contents locally on the device and another copy on a remote server. The electronic device 115 may retrieve content either through a local connection with the portable computing device 105 (e.g., using a USB cable or a wireless communication channel) or through a network connection with the remote server 110.

Figure 2A:
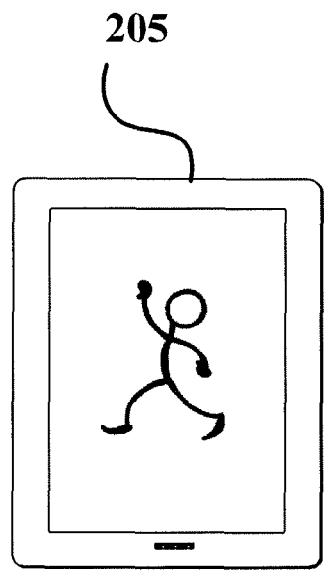
FIGS. 2(a) and 2(b) illustrate an example situation of when a state of content is transferred from a first device (e.g., a portable computing device) to a second device (e.g., a desktop) such that a user(s) may continue the activity from the first device on the second device in accordance with various embodiments.
Figure 2B:
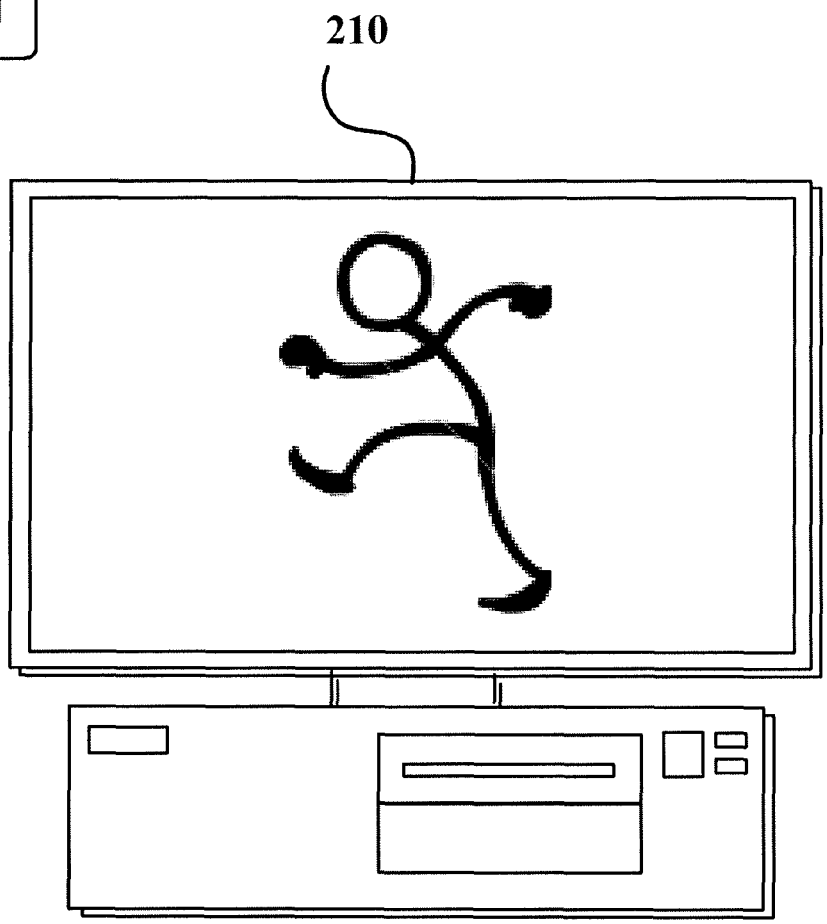

FIGS. 2(a) and 2(b) illustrate an example situation 200 of when a state of content is transferred from a first device (e.g., a portable computing device) to a second device (e.g., a desktop) such that a user(s) may continue the activity from the first device on the second device. This is useful in the situation where, for example, a user is in the middle of a video game or in the middle of jotting down notes on a mobile device and, as the user enters the apartments, desires to continue the video game or note taking on a desktop. A seamless transfer of the state information or content, such as the state information of the user's on-going video game or the then-current content of the user's notes, from the mobile device to the desktop, enables the user to continue playing the game or updating notes on a different device (e.g., a device with a larger screen).

As shown in FIG. 2(a), the screen of the mobile device 205 displays the state of an on-going television show. Without requiring another device to have the same application or program downloaded locally on the device, the user may continue his television show on a different device. In FIG. 2(b), the user has transferred the content and/or state information from the mobile device 205 to the user's desktop 210 (e.g., by selecting a virtual button displayed on the screen of the mobile device, by sending a uniform resource locator (URL) link from the mobile device to the desktop to enable the desktop to obtain the necessary information for syncing up the devices, etc.). As shown in the display of the user's desktop 210, the desktop displays a continuation of that displayed on the mobile device 205. The user of the desktop 210 may then resume watching the television show on a different device exactly where he had left off on the mobile device 205.

FIGS. 3(a) and 3(b) illustrate example situation 300 of replicating state of content from a portable computing device 320 to an electronic device 315 such that the electronic device displays the same state within a particular application as the portable computing device. As mentioned above, the electronic device may be a desktop computer, while the portable computing device may be a device such as a smartphone or tablet computer. Although this figure illustrates a transfer of content information from the portable computing device (e.g., a cell phone) to the electronic device (e.g., a desktop), one of ordinary skill would recognize that transferring content information and causing the device to display a same state within a particular application may also be performed the other way around (i.e., when a user continues playing a video game on the user's cell phone as he walks out of his apartment and away from his desktop). Further, although the terms "portable computing device" and "electronic device" are used in this example (and other examples throughout), it is understood that one may replicate state of content between devices of the same type (e.g., replicating state of content between multiple smartphones).

In some embodiments, the portable computing device 320 sends the electronic device 315 a link. In one instance, the link (e.g., a URL) enables the electronic device 315 to access a remote server that contains information about content and/or state information on the portable computing device 320. In another instance, the link (e.g., a device identifier) enables the electronic device 315 to establish a local connection with the portable computing device 320 so that the electronic device 315 can retrieve content and/or state information directly from the portable computing device 320. In yet another instance, the link enables the electronic device 315 to retrieve content (e.g., a video game application) from a remote server and state information (e.g., exact state of the user's progress in the video game application) from the portable computing device 320. As described above, the content may be a document, etc. that the user of the portable computing device wants to share with the user of the electronic device. In some embodiments, the link may be a URL that is transmitted to the electronic device through email, though an instant message, etc. The link of some embodiments may contain information about the portable computing device (e.g., IP address of the portable computing device, device identifier and/or locator), access information or permission for retrieving data from a remote server and/or from the portable computing device.

In some embodiments, the electronic device does not need to wait to receive a link from the portable computing device that enables the electronic device to access the content and/or state information on the portable computing device. Rather, the electronic device may actively initiate a request for content and/or state information from the portable computing device. To retrieve content and/or state information from the portable computing device, the electronic device of some embodiments sends a request "to the cloud" for device syncing or to retrieve the state of a particular application of interest operating on the portable computing device. The "cloud" as referred to in this document and as illustrated within the figures with a cloud shape refers to computational resources that are accessible through a computer network (e.g., Internet, LAN, WAN, etc.).

As shown in the first scenario 305 in FIG. 3(a), some embodiments enable the electronic device 315 to transmit the request to the cloud 325 (e.g., through a computer network). In some embodiments, the request is a request to obtain information that would enable the electronic device to recreate content that is displayed on the portable computing device. The request may include a request for application data that a user is currently using on the portable computing device (e.g., a request for a specific video game application such as Angry Birds®). The request may also include a request for state information that includes a current configuration of information in a program or application (e.g., a request for the then-current state information of the on-going video game).

In one example, the state information of a video file may include the video frame(s) that is currently being displayed on the portable computing device. In another example, the state information of a video game may include a level in the game. The state information for a particular user in Angry Birds® may be the level he is in, the number of pigs he knocked out, the location of the pigs, the number of birds remaining, the position and trajectory of a bird flying towards a target, etc.

In some embodiments, a request is submitted to the cloud upon a user's selection of the link received from the portable computing device. Some embodiments transmit the request to the cloud upon the user's input of a particular URL in a Web browser application. Different embodiments may cause the electronic device to submit a request for application data and/or state information differently.

The cloud or computing resources of some embodiments may then process the request from the electronic device by analyzing the requested information. In some embodiments, the request may include a request for application data. The request may also include a request for state information of the portable computing device such that the remote server must send a separate request to the portable computing device. In some embodiments, the remote server transmits a separate request to a portable computing device requesting the state information. As mentioned above, the portable computing device of some embodiments periodically updates the remote server of the current status or state information of ongoing activity on the portable computing device. For instance, the portable computing device may send the delta in a document to a remote server every minute or send the location within a video (e.g., a pointer to a particular frame) every ten seconds. In addition to periodical auto-saving to a remote server, the user of the portable computing device may also manually save and update the server of a current state of the device (e.g., by selecting a "save" option in an application).

In some embodiments, the portable computing device sends the state information to the cloud upon receiving the request for the state information. The remote server or the cloud may then send/forward the received state information to the electronic device. In some embodiments, upon receiving a request for state information from the cloud, the portable computing device sends the state information directly to the electronic device instead of going through the cloud. When a local connection between the electronic device and the portable computing device is available, some embodiments enable direct transmission of state information between the devices to save time and resources. Further, an electronic device may receive state information (e.g., state of a video game) locally from a portable computing device, the electronic device may still request/receive application data (e.g., video game application) from a remote server. This is because, while a relatively small amount of data transfer may be involved to retrieve state information, a considerably larger amount of data transfer may be required to request/receive application data. As a local connection between the electronic device and the portable computing device may be less suited to handle a larger data transfer, in at least certain instances, overall efficiency is improved when the electronic device requests/retrieves application data from a remote server. Further, in some embodiments, the electronic device is communicatively coupled with a cloud server and utilizes an application on the cloud server. The electronic device does not download or install the application locally and relies on the cloud server for all application-related processing.

As shown in the second scenario 310 in FIG. 3(a), some embodiments enable the electronic device 315 to transmit a request for application data to the cloud 325 and transmit a separate request for state information to the portable computing device 320. As shown in the figure, the electronic device 315 sends a request for an application (e.g., a Microsoft® Word application, an application for displaying and managing contact lists, a video application such as Angry Birds®) to the cloud. The electronic device 315 sends a separate request for the state information (e.g., document being currently edited, contact list information, level information) directly to the portable computing device 320, instead of going through the cloud.

In some embodiments, the request for an application may be a request to download the entire application onto the electronic device. The device of some embodiments may request a virtual instance of the application (e.g., a virtualized application or software as a service) that may be run on an environment of the electronic device or hosted in a remotely managed datacenter. Some embodiments may stream the application from the cloud such that only pieces of the application's code, data, and settings are needed for reproducing that displayed on the portable computing device in certain instances. Moreover, in some embodiments, the request for application data may be more than a request for the application itself, but may also be a request for data that was last saved onto the cloud by the portable computing device (e.g., data from the last auto-save, data from the last sync or save).

FIG. 3(b) illustrates the transfer of content and state information to the electronic device 315 (e.g., through the computer network(s)). In some embodiments, the portable computing device may send the state information to the cloud (e.g., when a direct connection between the portable and electronic devices is unavailable), which may then be forwarded to the electronic device. Some embodiments enable the portable computing device to send the state information directly to the electronic device. When the portable computing device sends the state information directly to the electronic device, the state information is not sent to a third party (e.g., a remote server) and forwarded to the electronic device, but is sent directly from the portable computing device to the electronic device (e.g., through Bluetooth®, Wi-Fi, etc.). This would not require a network connection to the cloud and thus can be sent offline to the electronic device, so long as a local connection is established between the two devices (e.g., Bluetooth®).

In some embodiments, the cloud (e.g., a remote server) sends the content and/or state information to the electronic device. As mentioned above, the cloud may send application data that includes the application and some content from the last sync or the application itself. The electronic device may then install the application on the device itself. In some embodiments, the cloud may stream the application from the server (i.e., application streaming) delivering parts of a program as needed. Some embodiments send content necessary for the electronic device to run the program or application centrally on the server, instead of having the electronic device locally store and run the program or application.

In some embodiments, the electronic device can generate a display that mirrors a state within content of the portable computing device using the received content and state information. As mentioned above, the electronic device can generate a display that mirrors a state within content of the portable computing device by identifying a location within the content using the state information. The location within the content may be a frame in a video clip, a point within an audio clip, a level within a video game, a page within a document, etc. The electronic device of some embodiments may use a pointer to mark or identify the location within the content that the portable computing device had left off.

Some embodiments enable the electronic device to display the generated information. In some embodiments, the portable computing device subsequently syncs the content on the device with the cloud. Some embodiments enable the portable computing device to send the state information to the cloud so as to retain this information centrally.

Figure 4A:
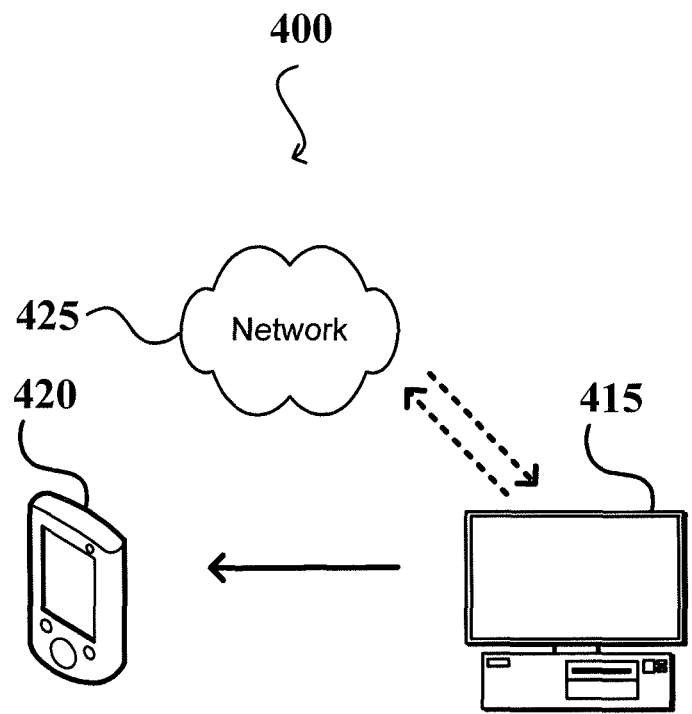
FIGS. 4(a) and 4(b) illustrate another example situation of how an electronic device may generate a display that matches the state of content on a portable computing device in accordance with various embodiments.
Figure 4B:
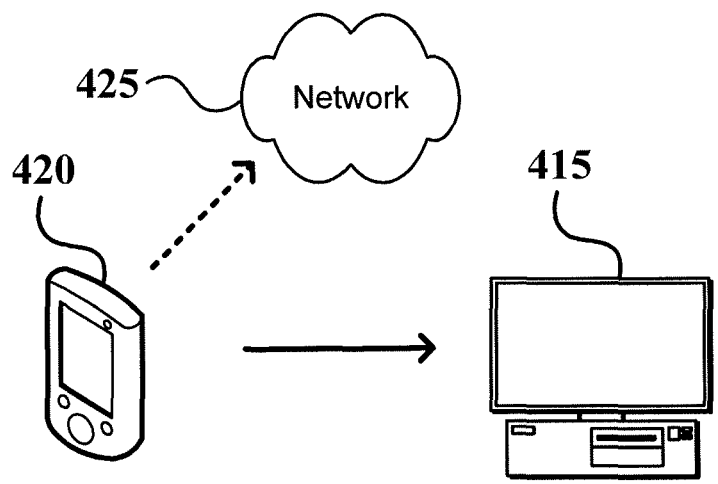

FIGS. 4(a) and 4(b) illustrate another example situation 400 of how an electronic device 415 may generate a display that matches the state of content on a portable computing device 420. In some instances, the electronic device may not have an established connection with the cloud at all times. The electronic device may nevertheless recreate that displayed on the portable computing device by receiving the content necessary at a prior time when connection was available and then by receiving the state information from the portable computing device when connection is not available. This would be useful in instances such as when two devices would like to sync during a camping trip where no Internet connection is available.

FIG. 4(a) illustrates the electronic device 415 requesting for content and state information. In some embodiments, the electronic device may request for content from the cloud at a time t1 when connection with the Internet is available and established. The electronic device of some embodiments downloads the necessary information for an application to run locally on the electronic device. As indicated by the dotted arrows, the electronic device 415 requests the content with the cloud and receives requested data (e.g., application data) while a connection is established. This may be performed before a camping trip, prior to entering a zone without Internet connection, or before a laptop loses connection with the Internet.

When a user of the electronic device wants to sync the electronic device with the portable computing device such that the devices have matching state with respect to the content, the user of the electronic device may request for state information from the portable computing device. In some embodiments, at a time t2, when no connection with the Internet is available, the electronic device may request for state information directly with the portable computing device. Some embodiments enable the electronic device to send a request via a Bluetooth® connection or a local connection through Wi-Fi or a USB connector cable.

FIG. 4(b) illustrates that the electronic device may receive the state information of the portable computing device directly from the portable computing device through a local connection (e.g., Bluetooth®, Wi-Fi, a USB connector cable, etc.). Without an Internet connection, the electronic device may recreate that displayed on the portable computing device using the application data previously downloaded and the state information received from the portable computing device.

The portable computing device may send the state information directly to the electronic device as packets of information in some embodiments. The electronic device of some embodiments may then replicate the state of the content of the portable computing device using the received state information. Similarly, the portable computing device may send the state information to the cloud when an Internet connection is again established. Oftentimes, the state information is a small amount of information compared to the content that is previously retrieved from the cloud. For instance, while the content may be a 90-minute long video, the state information may be a particular frame or a pointer directing to a frame for a video.

FIG. 5 illustrates an example process 500 for enabling an electronic device to display a current state of a content displayed on another device (e.g., a portable computing device) in accordance with at least one embodiment. It should be understood that, for any process discussed herein, there can be additional, fewer, or alternative steps performed in similar or alternative orders, or in parallel, within the scope of the various embodiments unless otherwise stated. In this example, the electronic device 502 transmits a request for data stored on the portable computing device. The data requested is a state of content in some embodiments. As described above, a state of content can be a level in a video game, a frame in a video clip, a point within a song, a page in a document, information of a particular contact within a contacts list application, etc. In some embodiments, the data requested is both state information and the content. For instance, the data requested may be both the application (i.e., the content) and the current state (e.g., a game level, a video frame) of a user of the portable computing device with respect to the application.

Some embodiments enable the electronic device to send the request directly to the portable computing device. In such embodiments, the electronic device may be requesting for state information of content from the portable computing device. In some embodiments, the request is first transmitted to a remote server, which then requests data stored on the portable computing device. As mentioned, the request may be a request for content and state information. The server may then send a separate request to the portable computing device for the state information of an application running on the portable computing device.

Before the electronic device transmits the request for data, the electronic device of some embodiments receives an invitation to transmit the request. In some embodiments, the invitation to transmit a request is sent by the portable computing device. The invitation to transmit may be in the form of one or more URLs that directs the electronic device to the resources it needs (e.g., the application data or state information residing on a remote server) or specifies the mechanism for retrieving the information. In some embodiments, the electronic device transmits the request when the user of the electronic device clicks on the URL. As mentioned, the electronic device may transmit one or more requests to the server, the portable computing device, or both. Moreover, in some embodiments, the electronic device transmits the request when the user directly inputs a URL into a Web browser application on the electronic device.

After the electronic device transmits the data request, the electronic device obtains content relating to the request from a first source 504. In some embodiments, the electronic device obtains application data from a server or another client device. As mentioned above, the electronic device may download the entire application data from the server, stream the necessary data from the server, or retrieve the information necessary for the electronic device to access an application running on a central server. If the electronic device already has the necessary data on the device itself (e.g., already has a copy of the application installed on the electronic device), then the electronic device may skip this step.

Then, the electronic device receives state information relating to the requested data from the portable computing device 506. In some embodiments, the portable computing device sends the state information to the cloud or remote server (e.g., over a wireless communication). The remote server may then forward the state information to the electronic device. Some embodiments enable the portable computing device to send the state information directly to the electronic device. The electronic device may establish a local connection (e.g., Wi-Fi, Bluetooth®) with the portable computing device so that the portable computing device may send the state information directly to the electronic device. This may be done even when there is no Internet connection available. When the devices are within a threshold range, the portable computing device may send the state information without having to go through a third party (e.g., a central server).

In some embodiments, the devices gauge the size of the state information that is to be transmitted to the electronic device. If the devices determine that the size of the state information exceeds a threshold size, then the portable computing device does not send the state information directly to the electronic device because the transmission between the devices can take too long. Some embodiments may on the other hand determine that the state information is less than a threshold size and therefore permit transmission. The portable computing device may then send the state information to the electronic device.

The electronic device then provides access to a state of the content on the electronic device based at least in part on the state information 508. Upon receiving the state information, the electronic device may replicate or mirror the state of the content on the portable computing device. For instance, the electronic device may locate a point in an audio clip where a user of the portable computing device has left off so that the user may seamlessly transition between devices. In another instance, the electronic device may continue playing a video game on different device without having to reconfigure the electronic device or restart on the electronic device. The electronic device of some embodiments then allows the user of the electronic device to have access to the state of the content on the electronic device that essentially mirrors the state of the content on the portable device.

As mentioned above, the electronic device of some embodiments may obtain the content (e.g., the application) and the state information at different times (e.g., while being at home as opposed to on the campsite). The electronic device may replicate the state of the content of the portable device anytime after the electronic device receives the state information.

Figure 6:
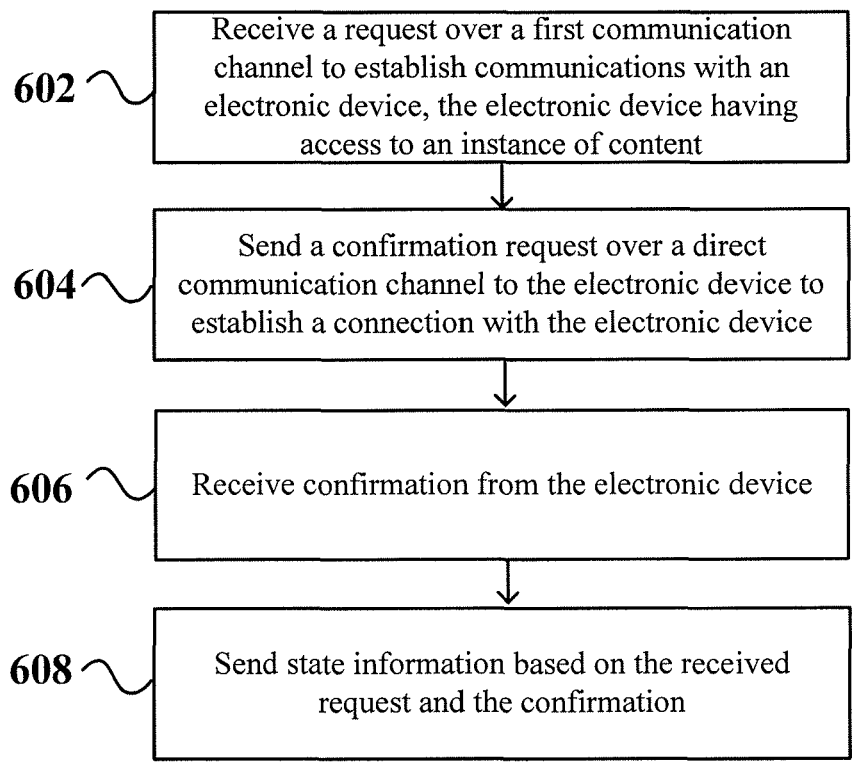
FIG. 6 illustrates an example process for sending state information to an electronic device in accordance with various embodiments.

FIG. 6 illustrates an example process 600 for sending state information to an electronic device in accordance with at least one embodiment. In this example, a request is received over a first communication channel to establish communications with an electronic device, the electronic device having access to an instance of content 602. In some embodiments, the electronic device sends a request for data (e.g., state information of a puzzle game) directly to a portable computing device through a communication channel (e.g., wireless communication channel such as Bluetooth® or Wi-Fi or wired communication channel using a USB cable). The portable computing device of some embodiments may receive a request indirectly from the electronic device. For instance, the portable computing device may receive a request from a remote server for state information (e.g., over a wireless communication channel) where the request from the server was made upon the server receiving an initial request from the electronic device. In another instance, the portable computing device may receive from the remote server a forwarded request from the electronic device for state information.

In some embodiments, the request includes identifying information (e.g., IP address, MAC address) for the electronic device. The portable computing device of some embodiments may then identify which electronic device has sent the request in order to send back the requested data. As mentioned above, the electronic device may have access to an instance of content on the electronic device (e.g., when the electronic device has installed the application), through streaming from the Internet, through applications kept and run on a central server, etc.

The portable computing device may then send a confirmation request over a direct communication channel to the electronic device to establish a connection with the electronic device 604. Some embodiments send a confirmation request to the electronic device upon receiving a request for data to confirm that the electronic device is the device that wants to establish a connection to receive the requested data. This is performed to make sure that the electronic device did make such a request before the portable computing device mistakenly sends over state information. The connection may be a wireless connection or a wired connection.

Then, the portable computing device may receive a confirmation from the electronic device 606. If the portable computing device does not receive a confirmation from the electronic device, then a connection will not be established. If the portable computing device receives a confirmation from the electronic device, then the portable computing device initiates and establishes a connection with the electronic device. In some embodiments, the established connection is a direct connection between the two devices.

One of ordinary skill would recognize that there are instances where different precautions are taken and that some embodiments may not perform 604 and 606. Instead of requesting the electronic device to confirm that the electronic device has made a request for data, the portable computing device of some embodiments may send a generated pin (e.g., in a separate email or text message) that the user of the electronic device may enter when prompted by a login screen. As would be apparent to one of ordinary skill in the art, there may be many ways to confirm that both devices would like to establish a connection between the devices.

The portable computing device may send state information based on the received request and the confirmation 608. Upon receiving the confirmation, the portable computing device of some embodiments establishes a connection with the electronic device and sends the state information to the electronic device. This, in turn, enables the electronic device to replicate a state of the content from the portable computing device on the electronic device.

Figure 7:
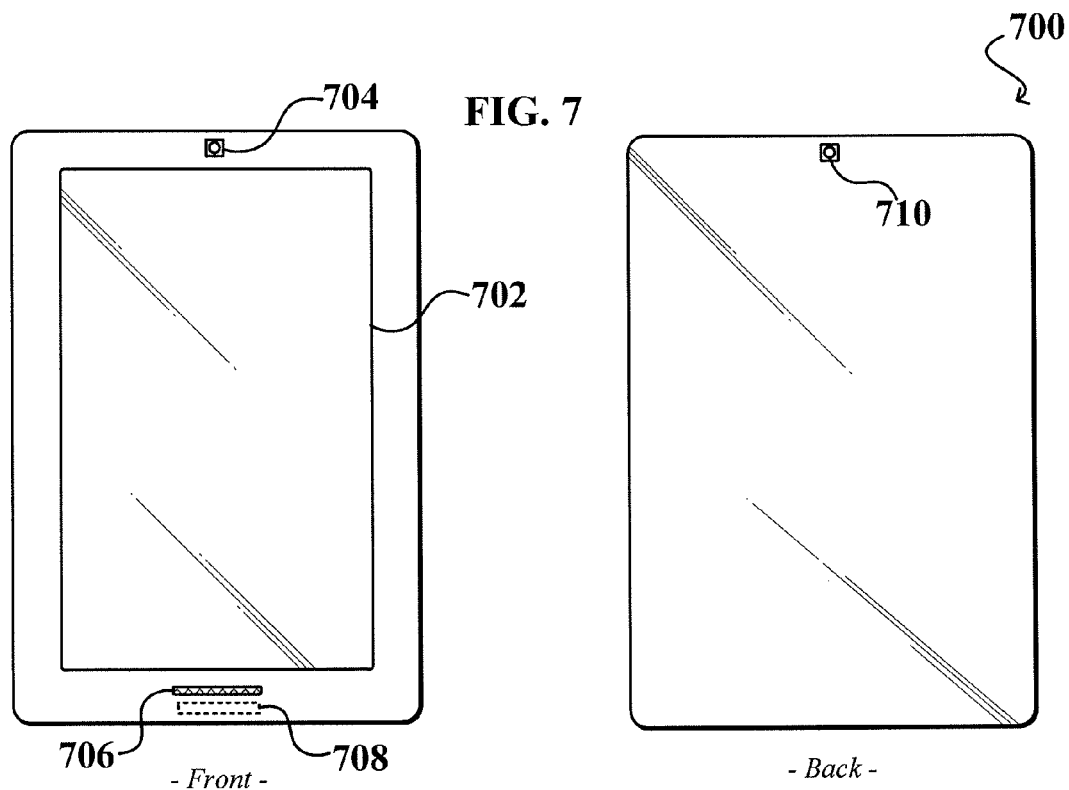
FIG. 7 illustrates front and back views of an example electronic user device that can be used in accordance with various embodiments.

FIG. 7 illustrates front and back views of an example electronic user device 700 that can be used in accordance with various embodiments. Although a portable computing device (e.g., a smartphone, an electronic book reader, or tablet computer) is shown, it should be understood that any electronic device capable of receiving, processing, and providing input can be used in accordance with various embodiments discussed herein. The devices can include, for example, desktop computers, notebook computers, personal data assistants, smartphones, video gaming consoles, television set top boxes, and portable media players, among others.

In this example, the user device 700 has a display screen 702 on the front side, which under normal operation will display information to a user facing the display screen (e.g., on the same side of the user device as the display screen). The user device in this example includes at least one front image capture element 704 and at least one back image capture element 710 positioned on the device such that, with sufficient lenses and/or optics, the user device 700 is able to capture image information in substantially any direction about the user device. The example user device 700 also includes at least one microphone 706 or other audio capture device capable of capturing audio data, such as words spoken by a user of the device or sounds indicative of an environment in which the device can currently be found.

The example user device 700 also includes at least one position and/or orientation determining element 708. Such an element can include, for example, an accelerometer or gyroscope operable to detect an orientation and/or change in orientation of the user device 700. An orientation determining element also can include an electronic or digital compass, which can indicate a direction (e.g., north or south) in which the device is determined to be pointing (e.g., with respect to a primary axis or other such aspect). A location determining element also can include or comprise a global positioning system (GPS) or similar positioning element operable to determine relative coordinates for a position of the computing device. Various embodiments can include one or more such elements in any appropriate combination. As should be understood, the algorithms or mechanisms used for determining relative position and/or orientation can depend at least in part upon the selection of elements available to the device.

Figure 8:
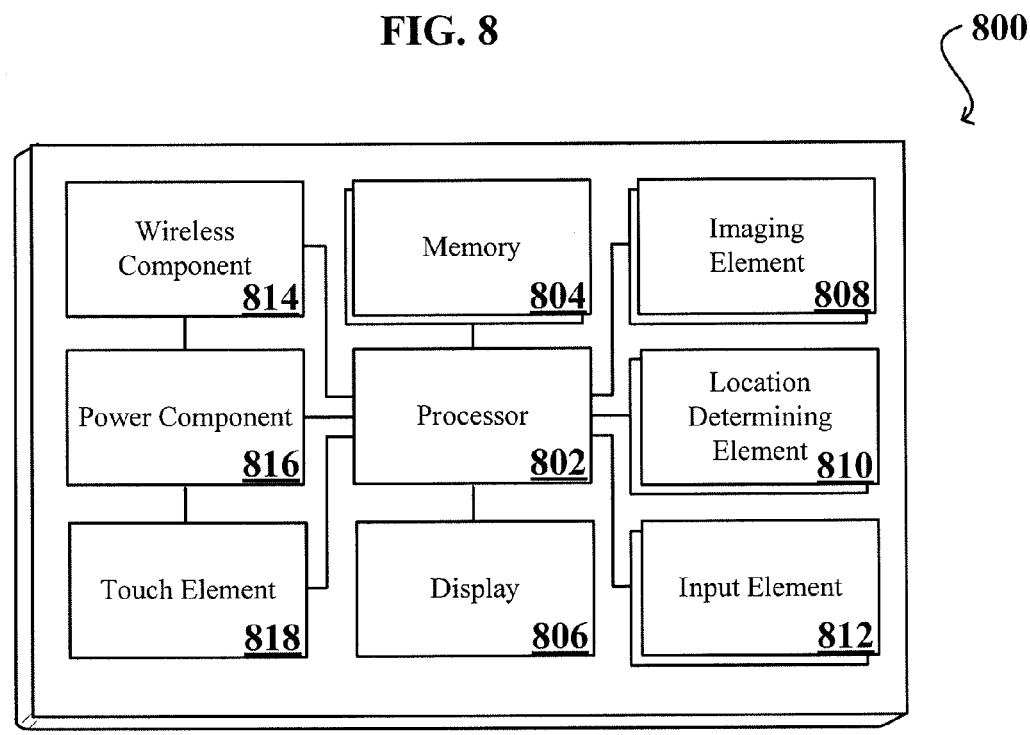
FIG. 8 illustrates example components of a computing device such as that illustrated in FIG. 7.

In order to provide functionality such as that described with respect to FIG. 7, FIG. 8 illustrates an example set of basic components of an electronic user device 800. In this example, the device includes at least one processor 802 for executing instructions that can be stored in at least one memory device or element 804. As would be apparent to one of ordinary skill in the art, the device can include many types of memory, data storage or computer-readable storage media, such as a first data storage for program instructions for execution by the processor 802, the same or separate storage can be used for images or data, a removable storage memory can be available for sharing information with other devices, etc. The device typically will include some type of display element 806, such as a touch screen, electronic ink (e-ink), organic light emitting diode (OLED) or liquid crystal display (LCD), although devices such as portable media players might convey information via other means, such as through audio speakers.

As discussed, the device in many embodiments will include at least one image capture element 808 such as a camera or infrared sensor that is able to objects in the vicinity of the device. It should be understood that image capture can be performed using a single image, multiple images, periodic imaging, continuous image capturing, image streaming, etc. Further, a device can include the ability to start and/or stop image capture, such as when receiving a command from a user, application, or other device. The device also can include one or more orientation and/or location determining elements 810, such as an accelerometer, gyroscope, electronic compass, or GPS device as discussed above. These elements can be in communication with the processor in order to provide the processor with positioning and/or orientation data.

In some embodiments, the device can include at least one additional input device 812 able to receive conventional input from a user. This conventional input can include, for example, a push button, touch pad, touch screen, wheel, joystick, keyboard, mouse, trackball, keypad or any other such device or element whereby a user can input a command to the device. These I/O devices could even be connected by a wireless infrared or Bluetooth or other link as well in some embodiments. In some embodiments, however, such a device might not include any buttons at all and might be controlled only through a combination of visual and audio commands such that a user can control the device without having to be in contact with the device.

The example device also includes one or more wireless components 814 operable to communicate with one or more electronic devices within a communication range of the particular wireless channel. The wireless channel can be any appropriate channel used to enable devices to communicate wirelessly, such as Bluetooth, cellular, or Wi-Fi channels. It should be understood that the device can have one or more conventional wired communications connections as known in the art.

The example device includes various power components 816 known in the art for providing power to a computing device, which can include capacitive charging elements for use with a power pad or similar device as discussed elsewhere herein. The example device also can include at least one touch- and/or pressure-sensitive element 818, such as a touch sensitive material around a casing of the device, at least one region capable of providing squeeze-based input to the device, etc. In some embodiments this material can be used to determine motion, such as of the device or a user's finger, for example, while in other embodiments the material will be used to provide specific inputs or commands.

Figure 9:
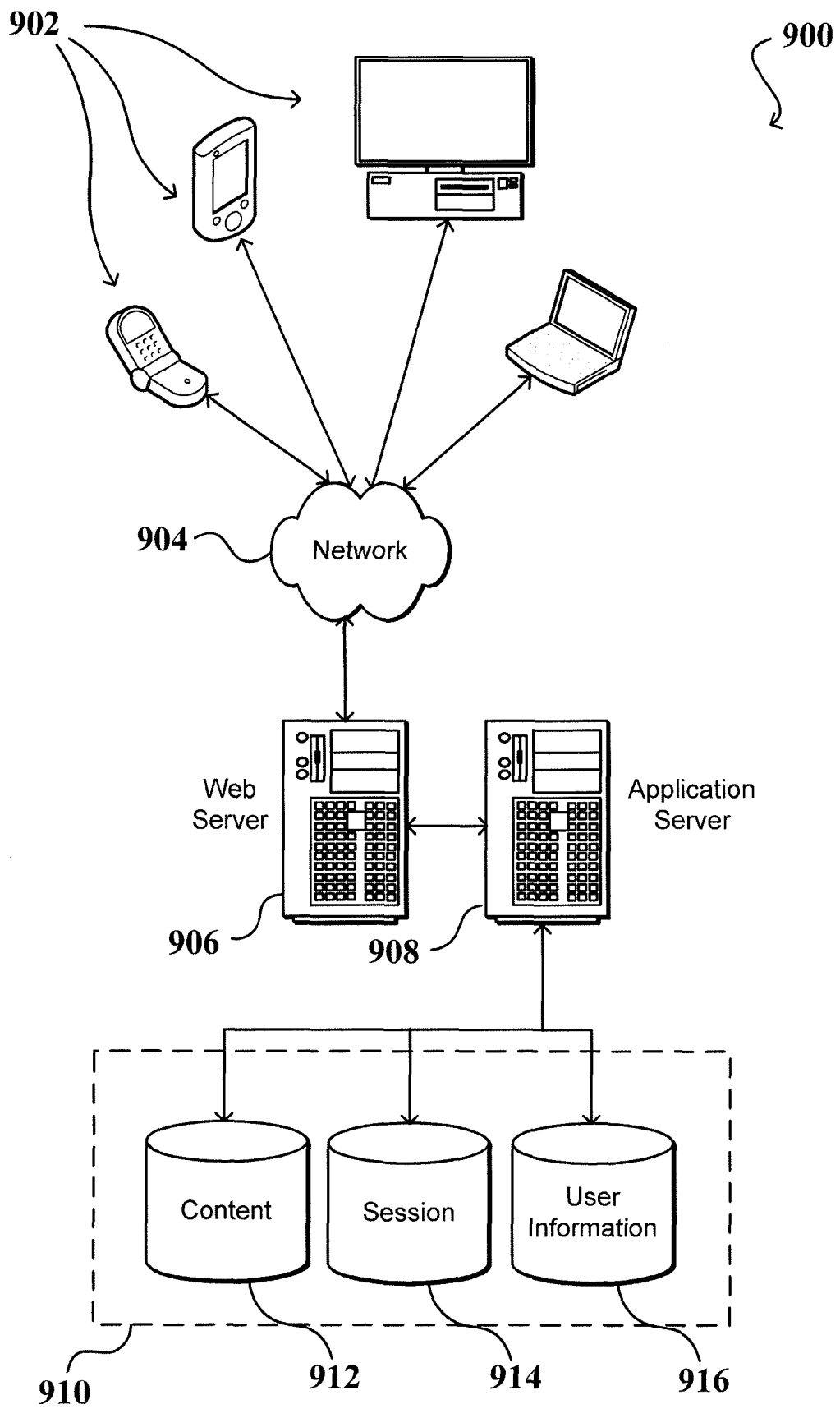
FIG. 9 illustrates an environment in which various embodiments can be implemented.

As discussed, different approaches can be implemented in various environments in accordance with the described embodiments. For example, FIG. 9 illustrates an example of an environment 900 for implementing aspects in accordance with various embodiments. As will be appreciated, although a Web-based environment is used for purposes of explanation, different environments may be used, as appropriate, to implement various embodiments. The system includes an electronic client device 902, which can include any appropriate device operable to send and receive requests, messages or information over an appropriate network 904 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 906 for receiving requests and serving content in response thereto, although for other networks, an alternative device serving a similar purpose could be used, as would be apparent to one of ordinary skill in the art.

The illustrative environment includes at least one application server 908 and a data store 910. It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The application server 908 can include any appropriate hardware and software for integrating with the data store 910 as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server 906 in the form of HTML, XML or another appropriate structured language in this example. The handling of all requests and responses, as well as the delivery of content between the client device 902 and the application server 908, can be handled by the Web server 906. It should be understood that the Web and application servers are not required and are merely example components, as structured code discussed herein can be executed on any appropriate device or host machine as discussed elsewhere herein.

The data store 910 can include several separate data tables, databases or other data storage mechanisms and media for storing data relating to a particular aspect. For example, the data store illustrated includes mechanisms for storing content (e.g., production data) 912 and user information 916, which can be used to serve content for the production side. The data store is also shown to include a mechanism for storing log or session data 914. It should be understood that there can be many other aspects that may need to be stored in the data store, such as page image information and access rights information, which can be stored in any of the above listed mechanisms as appropriate or in additional mechanisms in the data store 910. The data store 910 is operable, through logic associated therewith, to receive instructions from the application server 908 and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device 902. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 9. Thus, the depiction of the system 900 in FIG. 9 should be taken as being illustrative in nature and not limiting to the scope of the disclosure.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS and AppleTalk. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A method of enabling an electronic device to generate a display corresponding to a state of content on a portable computing device, the method comprising:
   receiving, at the electronic device, a link associated with the portable computing device, the link including a location from which to access content at a remote server, access information for the remote server, and identifying information for the portable computing device;
   transmitting a data request to the location associated with the link, the data request being received at the remote server and including the access information for the electronic device;
   receiving content related to the data request from the remote server;
   establishing communication with the portable computing device using the identifying information;
   receiving state information related to the data request directly from the portable computing device; and
   generating a display on the electronic device using the content and the state information,
   wherein a state of the content displayed on the electronic device matches a state of the content displayed on the portable computing device.

2. The method of claim 1, wherein transmitting the data request causes the data request to be sent to the portable computing device to establish the communication using the identifying information.

3. The method of claim 1, wherein the state information relates to a location within the content.

4. The method of claim 1, wherein establishing communication with the portable computing device is performed over a wireless channel that includes at least one of a Bluetooth channel, a cellular channel, and a Wi-Fi channel.

5. The method of claim 1, wherein the content is at least one of an audio file, a video file, a presentation, an application, a game, and wherein the state information is at least one of a point within the audio file, a frame within the video file, a page within a presentation, a portion within the application, a level in the game.

6. The method of claim 1, wherein the data request is transmitted over a Web browser of the electronic device.

7. A method of transferring a state of content of a first computing device to a second computing device, the method comprising:
   transmitting, from the second computing device, a request for data stored on the first computing device;
   obtaining content relating to the requested data from a source of content;

receiving state information relating to the requested data directly from the first computing device to the second computing device, wherein a state of the first computing device with respect to the content is transferred directly to, and accessible on, the second computing device; and enabling access to the content on the second computing device, wherein the state of the content on the second computing device matches a state of the content on the first computing device based at least in part on the received state information.

8. The method of claim 7, further comprising:
requesting authentication information from a user of the second computing device, authentication information comprising at least one of a pin, a fingerprint, a facial features input, a gesture input, and an eye scan input; and
determining whether the user is authorized to receive information from the first computing device using the authentication information.

9. The method of claim 7, wherein the obtained content is an address book application and the state of the content is contact information as stored on the first computing device.

10. The method of claim 7, wherein the state information is received over a wireless channel that includes at least one of a Bluetooth channel, a cellular channel, and a Wi-Fi channel.

11. The method of claim 7, wherein transmitting the request for data comprises:
sending a first request for the content directly to the source that is a remote server; and
sending a second request for the state information to the first computing device.

12. The method of claim 7, wherein the request is transmitted to the source that is a remote server operable to translate the request into multiple requests for the remote server and the first computing device.

13. The method of claim 7, wherein the request is transmitted through a Web browser of the second computing device.

14. The method of claim 7, further comprising:
receiving a uniform resource locator (URL) from the first computing device, wherein the request is transmitted to an address associated with the URL when a user of the second computing device selects the URL.

15. The method of claim 7, wherein the content is obtained through at least one of downloading the content from the source to the second computing device, data streaming the content from the source to the second computing device, and loading certain local resources to execute a remote application while maintaining a local virtual display.

16. The method of claim 7, further comprising:
determining a set of parameters of the second computing device; and
modifying a display of the state of the content on the second computing device based at least in part on the determined set of parameters,
wherein the modified display on the second computing device is of a different display resolution than a display of the state of the content on the first computing device.

17. The method of claim 7, wherein the second computing device is one of a monitor, a projector, a television, a notebook computer, and a personal computer, and the first computing device is one of a smartphone, a tablet computer, and a portable media player.

18. A method of enabling a user of a first computing device to seamlessly transition to using a second computing device during a usage of an application, the method comprising:

in response to transmitting a content request to a source of content for access to an instance of content, enabling access to the instance of content;
receiving a request over a first communication channel to establish communications with the second computing device;
sending a confirmation request over a direct communication channel to the second computing device to establish a connection with the second computing device;
receiving a confirmation from the second computing device;
sending state information based on the received request and the confirmation, the state information corresponding to a state of the instance of content on the first computing device;
replicating the state of the instance of content from the first computing device on the second computing device; and
enabling access to the instance of content on the second computing device at a state that matches the state of the instance of content on the first computing device.

19. The method of claim 18, wherein the state information is sent directly to the second computing device through a local connection.

20. The method of claim 18, wherein receiving the request, sending the confirmation request, receiving the confirmation, sending the state information are performed without an Internet connection.

21. The method of claim 18, further comprising:
determining whether a data size of the state information exceeds a threshold amount of data;
sending the state information to a remote server for transmission to the second computing device when the determined data size exceeds the threshold amount of data.

22. The method of claim 18, further comprising:
sending a link to the second computing device, wherein a selection of the link causes the request to be sent over the first communication channel from the second computing device.

23. A non-transitory computer readable medium storing a computing program for enabling an electronic device to have access to data on a computing device, the computer program comprising sets of instructions for:
transmitting, from the electronic device, a request for data stored on the computing device;
obtaining content relating to the requested data from a source;
receiving state information relating to the requested data from the computing device, wherein a state of the computing device with respect to the content is transferred directly to, and accessible on, the electronic device; and
enabling access to the content on the electronic device, wherein the state of the content on the second computing device matches a state of the content on the first computing device based at least in part on the state information.

24. The non-transitory computer readable medium of claim 23, wherein the state information is received directly from the computing device.

25. The non-transitory computer readable medium of claim 23, wherein the computer program further comprises a set of instructions for authenticating that a user of the electronic device has authority to access content from the computing device.

26. An electronic device, comprising:
a processor; and a memory device including instructions operable to be executed by the processor to perform a set of actions, enabling the electronic device to:

transmit a request for data stored on a computing device;

obtain content relating to the requested data from a source;

receive state information relating to the requested data from the computing device, wherein a state of the computing device with respect to the content is transferred directly to, and accessible on, the electronic device; and enable access to the content on the electronic device, wherein the state of the content on the second computing device matches a state of the content on the first computing device based at least in part on the state information.

27. The device of claim 26, wherein the content is obtained while the electronic device is communicatively coupled with the source, and wherein the state information is received while the electronic device is not communicatively coupled with the source.

28. The device of claim 26, wherein the state information is received directly from the computing device.

29. The device of claim 26, wherein the state information is received over a wireless channel that includes at least one of a Bluetooth channel, a cellular channel, and a Wi-Fi channel.

* * * * *